United States Patent
Riechert

(10) Patent No.: US 12,136,275 B2
(45) Date of Patent: Nov. 5, 2024

(54) METHOD AND DEVICE FOR DETERMINING THE ORIENTATION OF A SURFACE OF AN OBJECT

(71) Applicant: Cariad SE, Wolfsburg (DE)

(72) Inventor: Christian Riechert, Berlin (DE)

(73) Assignee: CARIAD SE, Wolfsburg (DE)

( * ) Notice: Subject to any disclaimer, the term of this patent is extended or adjusted under 35 U.S.C. 154(b) by 247 days.

(21) Appl. No.: 17/794,930

(22) PCT Filed: Jan. 13, 2021

(86) PCT No.: PCT/EP2021/050577
§ 371 (c)(1),
(2) Date: Jul. 22, 2022

(87) PCT Pub. No.: WO2021/148286
PCT Pub. Date: Jul. 29, 2021

(65) Prior Publication Data
US 2023/0351776 A1      Nov. 2, 2023

(30) Foreign Application Priority Data
Jan. 24, 2020   (DE) .......................... 102020101718.9

(51) Int. Cl.
*G05D 1/617*     (2024.01)
*B60R 1/24*      (2022.01)
(Continued)

(52) U.S. Cl.
CPC .............. *G06V 20/588* (2022.01); *B60R 1/24* (2022.01); *B60R 1/26* (2022.01); *B60W 30/06* (2013.01);
(Continued)

(58) Field of Classification Search
CPC .... G06T 7/70; G06T 7/73; G06T 7/74; G06T 7/75; G06T 7/77; G06T 2207/30252;
(Continued)

(56) References Cited

U.S. PATENT DOCUMENTS

2017/0206674 A1      7/2017 Westerhoff et al.

FOREIGN PATENT DOCUMENTS

EP         2092270 B1      9/2016

OTHER PUBLICATIONS

Mufti et al., Robust estimation of planar surfaces using spatio-temporal RANSAC for applications in autonomous vehicle navigation, available online: Sep. 12, 2011 [retrieved Sep. 18, 2024], Robotics and Autonomous Systems, vol. 60, Issue 1,pp. 16-28. Retrieval: https://doi.org/10.1016/j.robot.201 (Year: 2012).*
(Continued)

*Primary Examiner* — Matthew C Bella
*Assistant Examiner* — Dennis Rosario
(74) *Attorney, Agent, or Firm* — Seed IP Law Group LLP

(57) ABSTRACT

A method for determining the orientation of a surface of an object in a detection region before or behind a vehicle by means of a camera of the vehicle comprises the following steps: detecting a first image of the detection region by means of the camera, detecting a second image of the detection region following in time on the detecting of the first image and by means of the camera, generating of first image data corresponding to the first image and second image data corresponding to the second image, determining of eight image coordinates of four pixels each in the first image and the second image, corresponding to four points on the surface of the object, by means of the first image data and the second image data, determining of a normal vector of the surface of the object by means of the eight image coordi-
(Continued)

nates, determining of the orientation of the surface of the object by means of the normal vector.

18 Claims, 5 Drawing Sheets

(51) Int. Cl.
| | |
|---|---|
| *B60R 1/26* | (2022.01) |
| *B60W 30/06* | (2006.01) |
| *B60W 30/08* | (2012.01) |
| *B60W 30/09* | (2012.01) |
| *G01C 3/00* | (2006.01) |
| *G05D 1/622* | (2024.01) |
| *G05D 1/646* | (2024.01) |
| *G06N 20/00* | (2019.01) |
| *G06T 5/60* | (2024.01) |
| *G06V 10/70* | (2022.01) |
| *G06V 10/75* | (2022.01) |
| *G06V 20/56* | (2022.01) |
| *G08G 1/16* | (2006.01) |
| *H04N 13/221* | (2018.01) |
| *G01S 13/93* | (2020.01) |
| *G01S 13/931* | (2020.01) |
| *G01S 17/931* | (2020.01) |
| *G06V 10/20* | (2022.01) |
| *G06V 20/54* | (2022.01) |
| *G06V 20/58* | (2022.01) |
| *H04N 13/261* | (2018.01) |
| *H04N 13/264* | (2018.01) |
| *H04N 13/286* | (2018.01) |

(52) U.S. Cl.
CPC ............ *B60W 30/08* (2013.01); *B60W 30/09* (2013.01); *G01C 3/00* (2013.01); *G05D 1/617* (2024.01); *G05D 1/619* (2024.01); *G05D 1/622* (2024.01); *G05D 1/646* (2024.01); *G06N 20/00* (2019.01); *G06T 5/60* (2024.01); *G06V 10/70* (2022.01); *G06V 10/751* (2022.01); *G08G 1/16* (2013.01); *H04N 13/221* (2018.05); *B60R 2300/00* (2013.01); *B60R 2300/804* (2013.01); *B60W 2552/53* (2020.02); *G01S 13/93* (2013.01); *G01S 13/931* (2013.01); *G01S 2013/9318* (2020.01); *G01S 2013/93185* (2020.01); *G01S 17/931* (2020.01); *G06T 2207/30236* (2013.01); *G06T 2207/30241* (2013.01); *G06T 2207/30252* (2013.01); *G06T 2207/30256* (2013.01); *G06T 2210/21* (2013.01); *G06V 10/255* (2022.01); *G06V 20/54* (2022.01); *G06V 20/58* (2022.01); *G06V 20/582* (2022.01); *G06V 2201/08* (2022.01); *H04N 13/261* (2018.05); *H04N 13/264* (2018.05); *H04N 13/286* (2018.05)

(58) Field of Classification Search
CPC . G06T 2207/30256; G06T 2207/30261; G06T 2207/30264; G06T 2207/30248; G06T 7/20; G06T 7/246; G06T 7/292; G06T 2210/21; G06T 7/50; G06T 7/55; G06T 7/579; G06T 7/593; G06T 7/596; G06T 5/60; G06T 2207/30236; G06T 19/003; G06T 2207/30241; G06T 2207/20228; G06T 15/405; G06T 7/207; G06T 2207/20164; G06T 1/0014; G06V 20/56; G06V 20/58; G06V 20/582; G06V 20/584; G06V 20/586; G06V 20/588; G06V 10/764; G06V 20/625; G06V 20/62; G06V 20/63; G06V 2201/08; G06V 10/255; G06V 20/176; G06V 30/19173; G06V 20/54; G06V 10/70; G06V 20/00; G06V 20/38; G06V 20/39; G06V 2201/10; G06V 40/197; G06N 20/00; G01S 17/93; G01S 17/931; G01S 17/933; G01S 5/0072; G01S 17/58; G01S 17/08; G01S 13/93; G01S 13/931; G01S 2013/93185; G01S 2013/9315; G01S 2013/9314; G01S 2013/9316; G01S 2013/9317; G01S 2013/9318; G01S 2013/9319; G01S 2013/932; G01S 2013/9321; G01S 2013/9322; G01S 2013/9323; G01S 2013/9324; G01S 2013/9325; G01S 2013/9327; G01S 2013/93271; G01S 2013/93272; G01S 2013/93273; G01S 2013/93274; G01S 2013/93275; G01S 2013/93276; G01S 2013/93277; G01S 2013/93278; G01S 2013/9329; G01S 13/933; G01S 13/937; G01S 13/934; G01S 13/935; G01S 7/4808; G01S 17/42; G01S 15/08; B60W 30/09; B60W 30/08; B60W 2030/082; B60W 30/085; B60W 30/095; B60W 30/0953; B60W 30/0956; B60W 2552/53; B60W 40/10; B60W 30/06; G06F 18/24; H04N 13/271; H04N 13/128; H04N 2013/0081; H04N 13/264; H04N 13/261; H04N 13/266; H04N 13/268; H04N 13/286; H04N 13/289; H04N 13/293; H04N 5/145; H04N 25/705; H04N 13/221; H04N 2213/003; H04N 2213/005; B60R 2300/00; B60R 11/04; B60R 2300/107; B60R 2300/8093; B60R 2300/804; B60R 2300/8066; B60R 1/26; B60R 1/24; B60R 1/25; B60R 1/27; B60R 1/31; B60R 2300/301; B60R 2300/305; B60R 2300/304; B60R 1/22; B60R 1/23; B60R 2001/1253; B60R 2300/102; B60R 2300/10; B60R 2300/8026; B60R 1/20; B60R 2300/806; G01C 3/00; G08G 1/16; G08G 1/167; G08G 1/161; G08G 1/162; G08G 1/163; G08G 1/164; G08G 1/165; G08G 1/166; G08G 1/168; G05D 1/0246; G05D 1/0253; G05D 1/0251; G05D 1/0248; G05D 1/0212; G05D 1/0214; G05D 1/0219; G05D 1/0217; G05D 1/0221; G05D 1/0223; G05D 1/0225; G05D 1/021; G05D 1/02; G05D 1/622; G05D 1/617; G05D 1/618; G05D 1/621; G05D 1/619; G05D 1/628; G05D 1/633; G05D 1/637; G05D 1/646

See application file for complete search history.

(56) References Cited

OTHER PUBLICATIONS

Arróspide et al., "Homography-based ground plane detection using a single on-board camera," *IET Intelligent Transport Systems*, 4(2):149-160, 2010.

Cui et al., "Homography-based traffic sign localisation and pose estimation from image sequence," *IET Image Processing*, 13(14):2829-2839, 2019.

(56) References Cited

OTHER PUBLICATIONS

English translation of Written Opinion of the International Searching Authority, dated Apr. 21, 2021, for International Patent Application No. PCT/EP2021/050577. (6 pages).
Gabb et al., "Feature-Based Monocular Vehicle Turn Rate Estimation from a Moving Platform," *IEEE Intelligent Vehicles Symposium (IV)*, Jun. 23-26, 2013, Gold Coast, Australia, 2013, pp. 642-645.
German Office Action, dated Nov. 4, 2020, for German Application No. 10 2020 101 718.9, 9 pages.
Hartley et al., "4.8 Automatic Computation of a Homography," in Multiple View Geometry in Computer Vision, Cambridge University Press, 2004, pp. 123-127. (5 pages).
International Search Report, dated Jan. 24, 2020, for International Application No. PCT/EP2021/050577. (7 pages).
Malis et al., "Deeper understanding of the homography decomposition for vision-based control," Research Report RR-6303, INRIA, Sep. 2007. (90 pages).
Wu et al., "Detection of Text on Road Signs From Video," *IEEE Transactions on Intelligent Transportation Systems*, 6(4):378-390, Dec. 2005.

\* cited by examiner

METHOD AND DEVICE FOR DETERMINING THE ORIENTATION OF A SURFACE OF AN OBJECT

BACKGROUND

Technical Field

Embodiments of the invention relate to a method and a device for determining the orientation of a surface of an object in a detection region before or behind a vehicle, especially a highway vehicle, by means of a camera of the vehicle.

Description of the Related Art

In the field of autonomous driving and driver assist systems, image data is processed from images recorded by a camera secured to a vehicle, in order to determine the orientation of a surface of an object. If the orientation of such an object is wrongly determined, it may result in dangerous situations. For example, if a lane marking appearing similar to a rear end of a vehicle is wrongly assumed to be a vehicle, a sudden emergency braking will occur. On the contrary, if the rear end of a vehicle is wrongly identified as a lane marking, a rear-end collision may occur.

Document EP 2 092 270 B1 discloses a method and a device for recognition and position determination of planar objects in images, making use of a stereo camera.

The document Malis et al., Deeper understanding of the homography decomposition for vision-based control. RR-6303, INRIA. 2007, pp. 90, discloses a method for calculating a so-called homography matrix, which can be used to assess the movement of a calibrated camera between the taking of two pictures of a planar object. Moreover, the document discloses an analytical method for calculating a normal vector based on the homography matrix.

BRIEF SUMMARY

Some embodiments specify a method and a device in which it is easily possible to determine the orientation of a surface of an object in a detection region before or behind a vehicle by using a camera of the vehicle.

The method for determining the orientation of a surface of an object in a detection region before or behind a vehicle by means of a camera of the vehicle comprises the following steps:
  detecting first image of the detection region by means of the camera,
  detecting second image of the detection region following in time on the detecting of the first image by means of the camera,
  generating first image data corresponding to the first image and second image data corresponding to the second image,
  determining eight image coordinates of four pixels each in the first image and the second image, corresponding to four points on the surface of the object, starting from the first image data and the second image data,
  determining a normal vector of the surface of the object by means of the eight image coordinates,
  determining the orientation of the surface of the object by means of the normal vector.

The camera may be firmly connected to the vehicle. The detection region can be in particular a portion of a lane in front of or behind the vehicle. The vehicle is in particular a highway vehicle.

In order to determine the orientation of the surface, first of all the first image is recorded. Following in time on this, the second image is recorded. If the vehicle is in movement during this time, the position of the object will change relative to the vehicle between the recording of the first and the second image. With few exceptions, such as when the object is another vehicle moving at exactly the same speed as the vehicle with the camera, the four image coordinates of the four pixels in the first image are different from the four image coordinates of the four pixels in the second image. From this shift in the pixels, geometrical methods can be used to determine the normal vector and thus the orientation of the surface of the object relative to the vehicle. In order to determine the orientation of the surface, it is sufficient for the first and the second image to not be stereoscopic images. Thus, in order to carry out the method, all that is needed is a mono camera, i.e., a camera having a single lens and detecting only non-stereoscopic images. The method described herein is thus easy to carry out.

In one embodiment, a homography is determined by means of the eight image coordinates, which converts the four pixels in the first image into the four pixels in the second image. The homography is determined in the form of a homography matrix, and the normal vector is determined by means of the homography matrix. The homography is a geometrical mapping which converts the four image coordinates of the four pixels in the first image into the four image coordinates of the four pixels in the second image. This mapping can be represented in the form of the homography matrix, which can be determined by means of suitable methods from the eight image coordinates. From the elements of the homography matrix, the normal vector can be determined in quick and robust manner. Thus, a reliable determination of the orientation of the surface is possible by means of the homography matrix.

In another embodiment, the homography matrix is used to determine a distance between the camera and the surface of the object. In particular, a distance is determined between an aperture of the camera and the surface of the object. The distance may be determined along the normal vector. Similar to the normal vector, the distance can also be determined between the camera and the surface from the elements of the homography matrix. Thus, the homography matrix makes possible a reliable determination of the distance between the camera and the surface of the object.

The homography matrix may be determined in a numerical or analytical method. This makes possible a simple calculation of the homography matrix.

In another embodiment, the normal vector is used to determine a pitch angle, corresponding to a tilting of the normal vector about the transverse axis of the vehicle against the vertical axis of the vehicle-fixed system of coordinates. The pitch angle is used to determine the orientation of the surface of the object. A pitch angle of 90° means that the surface is perpendicular to the direction of travel of the vehicle. A pitch angle of 0° means that the surface of the object is parallel to the lane in which the vehicle is moving. Thus, with the aid of the pitch angle, a reliable decision can be made, for example, as to whether the object can be passed safely.

In another embodiment, the first image data are used to determine an image region of the first image encompassing the surface of the object. A subset of the first image data corresponding to the image region is used to determine image coordinates corresponding to the four pixels in the first image. In particular, the image region of the first image is determined with the aid of an image recognition method.

An image recognition method may be used that can identify certain classes of object, such as lane markings, vehicles, traffic signs, and other road users. The image region may be a rectangle minimally enclosing the surface of the object. By determining the image region, the first image is trimmed to a relevant region. This makes the further processing easier. It is also possible to determine more than one image region of the first image, each of them corresponding to an object with a surface whose orientation is being determined.

In another embodiment, the first image data are used to determine, by using an image recognition method, especially a machine learning method, the image coordinates corresponding to the four pixels in the first image. In particular, the image recognition method is adapted such that three of the four points are linearly independent. This ensures that the homography matrix can be successfully determined. Thus, thanks to the use of the image recognition method, the robustness and hence the reliability of the determination of the orientation of the surface are enhanced.

In another embodiment, the first image data, the second image data and the image coordinates corresponding to the four pixels in the first image are used to determine, making use of an image processing method, especially a method based on optical flow or a machine learning method, further image coordinates corresponding to the four pixels in the second image. The positions of the four pixels in the image frame of the camera vary between the taking of the first image and the taking of the second image. The four pixels move evenly through the image frame. The image processing method tracks this movement, so that the four pixels can be found quickly in the second image. Thus, in particular, the determination of the orientation of the surface is accelerated. In particular, a tracking method can be used for tracking the movement and finding the pixels in the second image.

In another embodiment, the orientation of the surface of the object is used to judge whether the vehicle can safely pass the object. In particular, objects whose surface lies in the plane of the roadway, such as lane markings, can be safely passed. The determination of the orientation of the surface provides an easily determined criterion for determining whether the vehicle can safely pass the object.

In another embodiment, the orientation of the surface of the object is further processed as an input parameter of an object recognition method. The object recognition method can distinguish, for example, whether the object is the rear end of a vehicle or whether a lane marking has been wrongly identified as such. This can be used to make the object recognition method more reliable.

In another embodiment, the orientation of the surface of the object is used to determine whether the object is a lane marking. If the surface of the object lies in the plane of the roadway, it can be assumed with great likelihood that the object is a lane marking. This information can be used, for example, by a driver assist system in order to highlight this lane marking for the driver of the vehicle. Likewise, the information as to whether the object is a lane marking can be used by a system for autonomous driving of the vehicle in order to determine the trajectory, i.e., to perform an avoidance or braking maneuver, for example.

Embodiments of the invention moreover relate to a device for determining the orientation of a surface of an object in a detection region before or behind a vehicle, especially a highway vehicle, having a camera, which is adapted to detect a first image of the detection region, to detect a second image of the detection region following in time on the detecting of the first image, and to generate first image data corresponding to the first image and second image data corresponding to the second image, and having a control unit, which is adapted to use the first image data and the second image data to determine eight image coordinates of four pixels each in the first image and the second image, corresponding to four points on the surface of the object. The control unit uses the eight image coordinates to determine a normal vector of the surface of the object, and the normal vector is used to determine the orientation of the surface of the object.

The device has the same advantages as the method described herein, and can be modified in the same way.

The camera may be a mono camera. Mono cameras are more economical than comparable stereo cameras. Furthermore, mono cameras do not need any costly calibration. Thanks to the use of a mono camera, the device can thus be produced more cost effectively and has less maintenance expense.

The camera may be firmly connected to the vehicle.

BRIEF DESCRIPTION OF THE SEVERAL VIEWS OF THE DRAWINGS

Further features and benefits will emerge from the following description, explaining more closely embodiments in connection with the figures.

DETAILED DESCRIPTION

Figure 1:
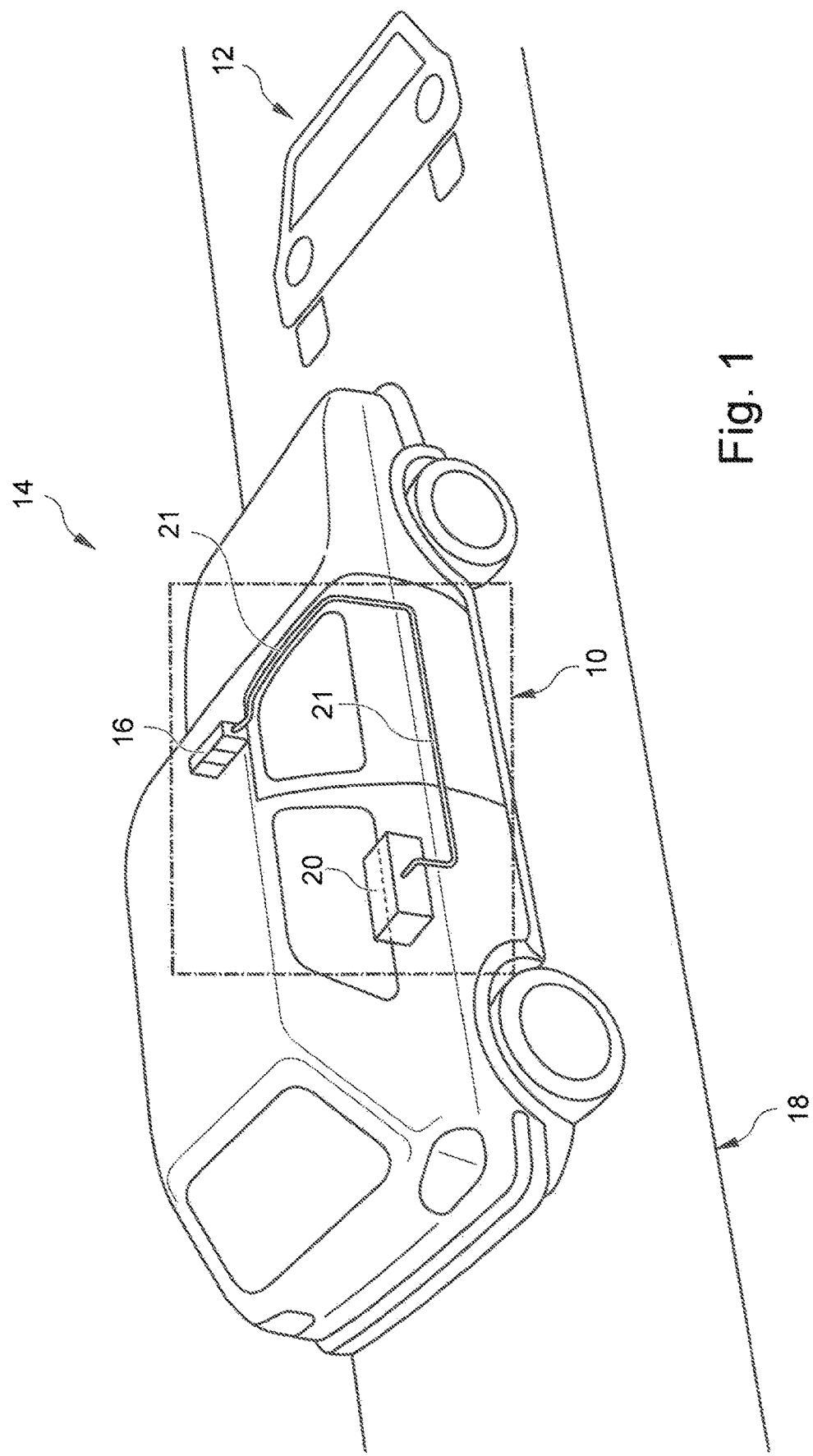
FIG. 1 shows a schematic representation of a device for determining the orientation of a surface of an object in a detection region before or behind a vehicle.

FIG. 1 shows a schematic representation of a device 10 for determining the orientation of a surface of an object 12 in a detection region before or behind a vehicle 14.

The object 12 is represented in FIG. 1 for example as a lane marking, which looks similar to a front end or rear end of another vehicle. Alternatively, the object 12 may also be another vehicle, for example.

The device 10 comprises a camera 16, which is designed as a mono camera and is firmly connected to the vehicle 14. The camera 16 is oriented in the direction of travel of the vehicle 14, such that it can detect a detection region on a traffic lane 18 in front of the vehicle 14. The device 10 moreover comprises an image processing and evaluation unit 20, which is connected by a cable 21 to the camera 16 and which forms a control unit of the device. The image processing and evaluation unit 20 is adapted to use image data generated from images 22, 24 (see FIGS. 3a and 3b) recorded by the camera 16 to determine the orientation of the surface 26 (see FIG. 2) of the object 12. For this, a first image 22 of the detection region is detected by means of the camera 16 and a second image 24 of the detection region, following in time on the detection of the first image 22, is detected by means of the camera 16. First image data corresponding to the first image 22 and second image data corresponding to the second image 24 are generated. The image processing and evaluation unit 20 determines from the image data eight image coordinates of four pixels each in the first image 22 and the second image 24, corresponding to four points a to d (see FIG. 2) on the surface 26 of the object 12.

By means of these eight image coordinates, the image processing and evaluation unit 20 determines a normal vector n of the surface 26 of the object 12. Moreover, the image processing and evaluation unit 20 determines by means of the normal vector n the orientation of the surface 26 of the object 12. The determination method is described more closely below with the aid of FIGS. 2 to 4.

Figure 2:
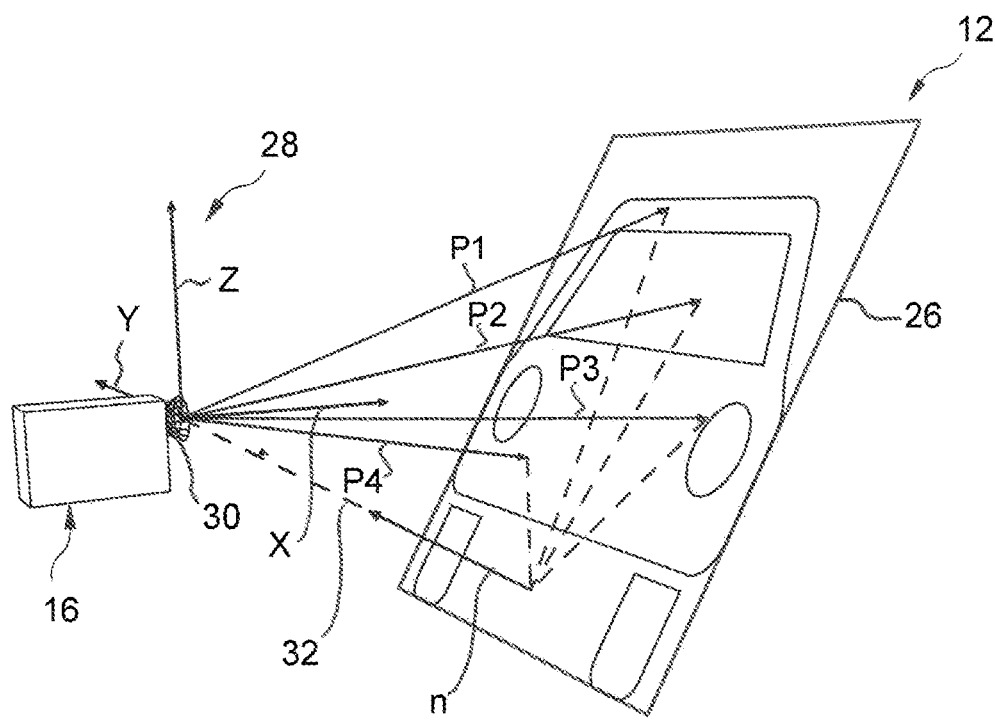
FIG. 2 shows a schematic representation of a camera of the device of FIG. 1 and the object.

FIG. 2 shows a schematic representation of the camera 16 of the device 10 of FIG. 1 and the object 12. FIG. 2 moreover shows a coordinate cross 28 of a camera-fixed system of coordinates. Since the camera 16 is firmly connected to the vehicle 14, the camera-fixed system of coordinates is at the same time a vehicle-fixed system of coordinates. A first coordinate direction X is the direction of travel of the vehicle 14, a second coordinate direction Y is the transverse axis of the vehicle 14, and a third coordinate direction Z is the vertical axis of the vehicle 14.

The position of the four points a to d on the surface 26 of the object 12 is represented in FIG. 2 by four arrows P1 to P4, emerging from a camera optics 30 of the camera 16. The position of the four points a to d relative to the camera 16 will change on account of a relative movement between the vehicle 14 and the object 12 from the time of taking the first image 22 to the time of taking the second image 24. In this way, the image coordinates of the pixels associated with the four points a to d on the surface 26 of the object 12 will also change. In other words: the pixels associated with the four points a to d on the surface 26 of the object 12 in the first image 22 have different image coordinates than those in the second image 24. This is described more closely below with the aid of FIGS. 3a and 3b.

How the image coordinates of the four points a to d on the surface 26 of the object 12 will change depends on the one hand on the relative movement between the vehicle 14 and the object 12 and on the other hand on the orientation of the surface 26. Therefore, it is possible for the image processing and evaluation unit 20 to use the image data to determine the orientation of the surface 26 in the form of the normal vector n, being represented in FIG. 2 as an arrow emerging from the surface 26 of the object 12 and pointing in the direction of the camera optics 30 of the camera 16. How to determine the normal vector n is described more closely below with the aid of FIG. 4. Moreover, the normal vector n defines a distance between the vehicle 14 and the object 12 as the distance between the camera optics 30 and the point of tangency of the normal vector n on the surface 26 of the object 12. This distance is represented as a broken line 32 in FIG. 2.

Figure 3A:
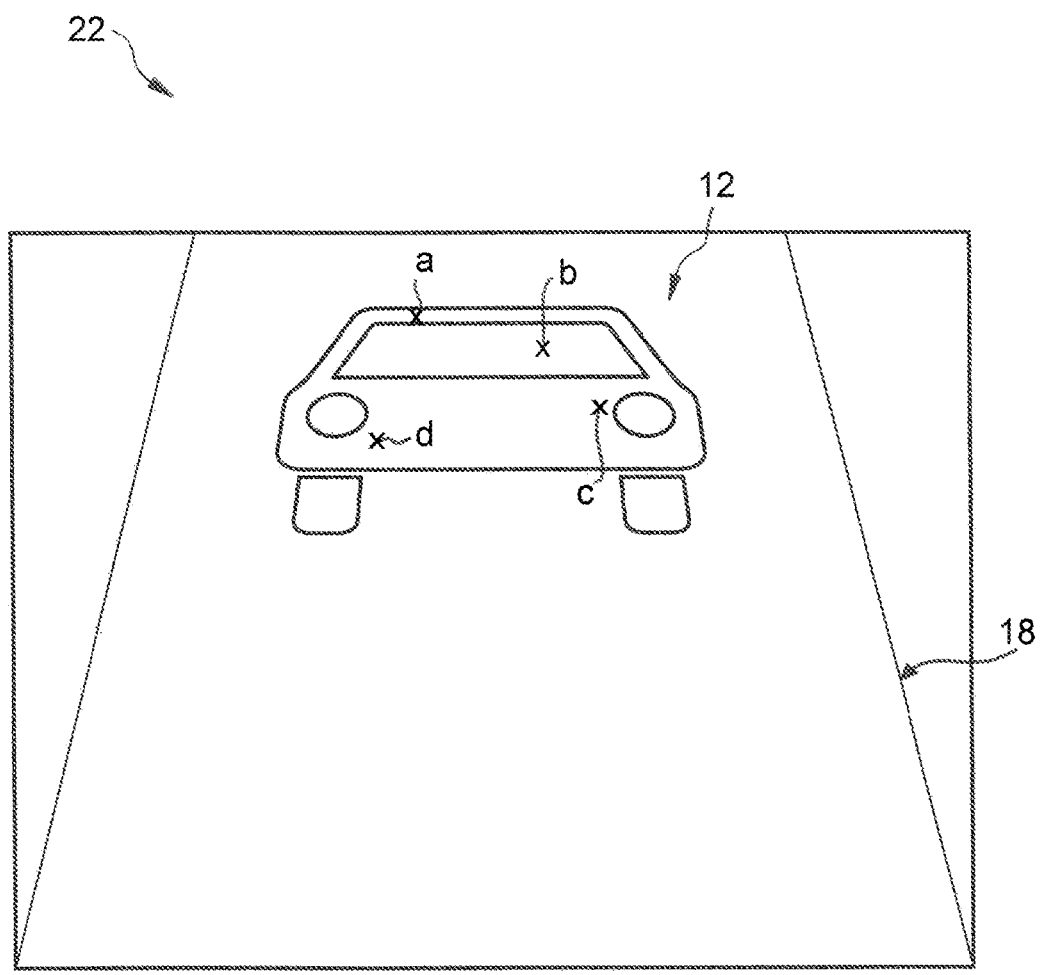
FIG. 3a shows a schematic representation of a first image of the detection region.

FIG. 3a shows a schematic representation of the first image 22 of the detection region which has been recorded by the camera 16. The first image shows the detection region on the traffic lane 18 in front of the vehicle 14 with the object 12. The position of the pixels corresponding to the four points a to d on the surface 26 of the object 12 are indicated by crosses in FIGS. 3a and 3b.

Figure 3B:
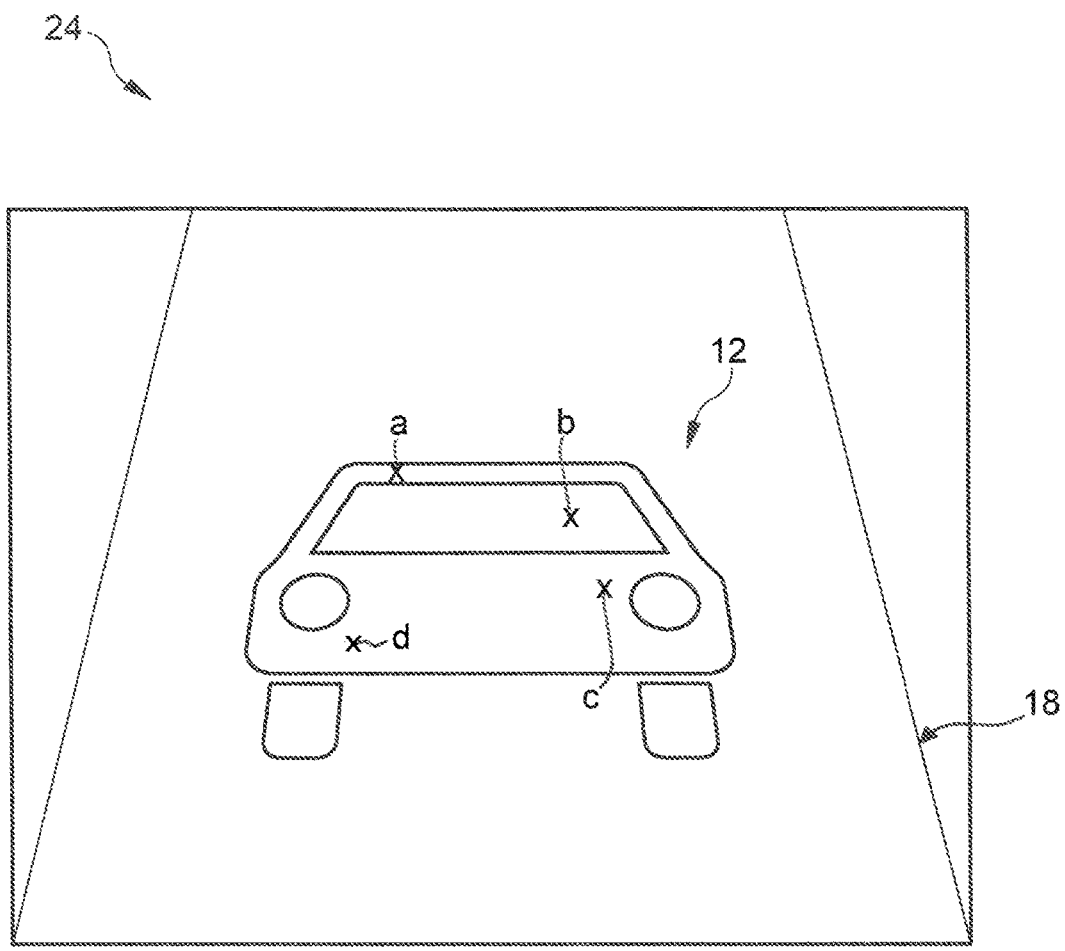
FIG. 3b shows a schematic representation of a second image of the detection region.

FIG. 3b shows a schematic representation of the second image 24 of the detection region which has been recorded by the camera 16. The second image 24 shows the detection region on the traffic lane 18 in front of the vehicle 14 with the object 12 at a later time than that of the recording of the first image 22. The position of the pixels corresponding to the four points a to d on the surface 26 of the object 12 has changed as compared to FIG. 3a, since the relative position between the vehicle 14 and the object 12 has changed between the recording of the first image 22 and the recording of the second image 24.

Figure 4:
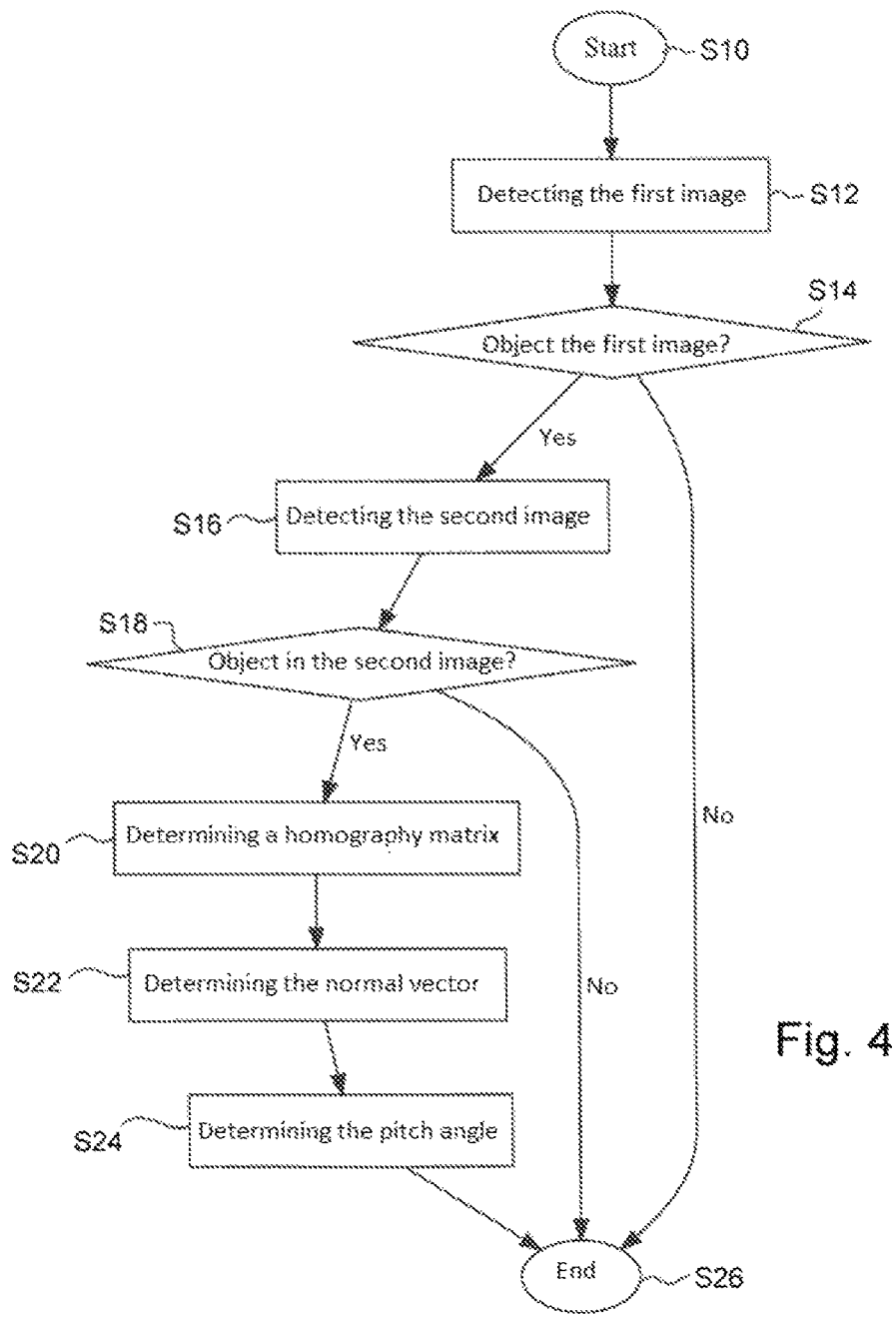
FIG. 4 shows a flow chart of one sequence for determining the orientation of the surface.

FIG. 4 shows a flow chart of a sequence for determining the orientation of the surface 26.

In step S10, the sequence begins. In step 512, the camera 16 is used to record the first image 22 of the detection region. Next, in step S14, an image recognition method, especially a machine learning method, is used to determine whether a relevant object 12 is present in the first image 22.

If no such object 12 can be found in the first image 22, the sequence ends in step S24. Otherwise, a suitable method is used to determine the image coordinates of the four pixels in the first image 22 corresponding to the four points a to d on the surface 26 of the object 12. The points are chosen such that three of the four points a to d are linearly independent.

Next, following in time on step S12, the second image 24 of the detection region is recorded in step S16. In step S18, the image recognition method is used to determine whether the object 12 is present in the second image 24. If the object 12 cannot be found again in the second image 24, the sequence ends in step S24. Otherwise, a suitable method, especially one based on optical flow, is used to determine the image coordinates of the four pixels in the second image 24 corresponding to the four points a to d on the surface 26 of the object 12.

In step S20, the eight image coordinates are used to determine a homography matrix H, which converts the image coordinates of the four pixels in the first image 22 into the image coordinates of the four pixels in the second image 24.

Next, in step S22, the normal vector n is calculated from elements of the homography matrix H. For this, first of all the matrix S is determined by symmetrizing the homography matrix H:

$$S = H^T H - I$$

Here, I is the 3×3 unity matrix. In the following, the elements of the symmetrical matrix S are designated with $s_{ij}$ and the minor corresponding to the element $s_{ij}$ is designated as $M_{s_{ij}}$. The normal vector n can then be written as $$n = \frac{n'}{\|n'\|}$$

$$n' = \begin{pmatrix} s_{12} + \sqrt{-M_{s_{33}}} \\ s_{22} \\ s_{23} + \epsilon_{13}\sqrt{-M_{s_{11}}} \end{pmatrix}$$

Where $\epsilon_{13}$ is the sign of the minor of S corresponding to the element $s_{13}$.

Next, in step S24, a pitch angle is determined from the normal vector n, corresponding to a tilting of the normal vector n about the y-axis, i.e., the transverse axis of the vehicle 14, against the z-axis, i.e., the vertical axis of the vehicle-fixed system of coordinates. The pitch angle is then used to determine the orientation of the surface 26 of the object 12. The method then ends in step S26.

The detection region in the embodiment shown is in front of the vehicle 14. Of course, the embodiments of the method shown can also be applied to a region behind the vehicle 14.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for determining an orientation of a surface of an object in a detection region before or behind a vehicle using a camera of the vehicle, comprising:
   detecting a first image of the detection region using the camera,
   detecting a second image of the detection region following in time on the detecting of the first image using the camera,
   generating first image data corresponding to the first image and second image data corresponding to the second image,
   determining eight image coordinates of four pixels each in the first image and the second image, corresponding to four points on the surface of the object, using the first image data and the second image data,
   determining a normal vector of the surface of the object using the eight image coordinates,
   determining the orientation of the surface of the object using the normal vector, and
   using the orientation by a system of autonomous driving of the vehicle to perform an avoidance or braking maneuver.

2. The method according to claim 1, wherein a homography is determined using the eight image coordinates, which converts the four pixels in the first image into the four pixels in the second image, wherein the homography is determined in the form of a homography matrix, and wherein the normal vector n is determined using the homography matrix.

3. The method according to claim 2, wherein the homography matrix is used to determine a distance between the camera and the surface of the object.

4. The method according to claim 2, wherein the homography matrix is determined in a numerical or analytical method.

5. The method according to claim 1, wherein the normal vector is used to determine a pitch angle, corresponding to a tilting of the normal vector about the transverse axis of the vehicle against the vertical axis of the vehicle-fixed system of coordinates, and wherein the pitch angle is used to determine the orientation of the surface of the object.

6. The method according to claim 1, wherein the first image data are used to determine an image region of the first image encompassing the surface of the object, and a subset of the first image data corresponding to the image region is used to determine image coordinates corresponding to the four pixels in the first image.

7. The method according to claim 6, wherein the image region is a rectangle minimally enclosing the surface of the object.

8. The method according to claim 1, wherein the first image data are used to determine, by using an image recognition method, the image coordinates corresponding to the four pixels in the first image.

9. The method according to claim 1, wherein the first image data, the second image data and the image coordinates corresponding to the four pixels in the first image are used to determine, making use of an image processing method, further image coordinates corresponding to the four pixels in the second image.

10. The method according to claim 1, wherein the orientation of the surface of the object is used to judge whether the vehicle can safely pass the object.

11. The method according to claim 1, wherein the orientation of the surface of the object is further processed as an input parameter of an object recognition method.

12. The method according to claim 1, wherein the orientation of the surface of the object is used to determine whether the object is a lane marking.

13. A device for determining an orientation of a surface of an object in a detection region before or behind a vehicle, comprising:
   a camera, which is adapted to:
   detect a first image of the detection region,
   detect a second image of the detection region following in time on the detecting of the first image, and
   generate first image data corresponding to the first image and second image data corresponding to the second image, and
   an image processing and evaluation unit, which is adapted
      to use the first image data and the second image data to determine eight image coordinates of four pixels each in the first image and the second image, corresponding to four points on the surface of the object,
      to determine, using the eight image coordinates, a normal vector n of the surface of the object, and
      to determine, using the normal vector n, the orientation of the surface of the object.

14. The device according to claim 13, wherein the camera is a mono camera.

15. The device according to claim 13, wherein the camera is firmly connected to the vehicle.

16. The method according to claim 8 wherein the image recognition method is a machine learning method.

17. The method according to claim 9 wherein the image processing method is a method based on optical flow or a machine learning method.

18. The device according to claim 13 wherein the vehicle is a highway vehicle.

* * * * *